Feb. 16, 1971  E. L. RECTOR  3,562,983
TRAILER SKIRTING
Filed July 7, 1969  3 Sheets-Sheet 1

INVENTOR.
EUGENE·L·RECTOR.
BY
ATTORNEY

Feb. 16, 1971  E. L. RECTOR  3,562,983
TRAILER SKIRTING

Filed July 7, 1969  3 Sheets-Sheet 2

INVENTOR.
EUGENE L. RECTOR
BY
ATTORNEY

INVENTOR.
EUGENE L. RECTOR.
BY
ATTORNEY

3,562,983
TRAILER SKIRTING
Eugene L. Rector, Syracuse, N.Y., assignor of one-half to
Gerald H. Wolkon, Liverpool, N.Y.
Filed July 7, 1969, Ser. No. 839,557
Int. Cl. B62d 39/00, 63/08; E04b 1/34
U.S. Cl. 52—169    5 Claims

ABSTRACT OF THE DISCLOSURE

Skirt assembly for house trailers comprising an upper elongate panel adapted to be secured beneath the trailer and reach part way to the ground, and a plurality of vertical staves slidably connected to one another, and slidably disposed in a slot in a flange along the panel bottom edge.

---

This invention relates to trailer skirting.

It is common practice to park a house trailer in a trailer parking lot for a temporary or longer stay at any particular location, or as a permanent home. In any case it is the usual practice to provide a foundation for the trailer free from its usual running gear, the foundation being capable of supporting the trailer with its floor level, in a solid manner free of the yield of the running gear including the pneumatic tires on the wheels and springs. When this is done, there is generally left an unsightly gap between the trailer and the ground over which it is supported. Various attempts to cover the space with plywood and other skirting have been employed. When such plywood is affixed to the trailer, any settling of the trailer or change in ground contour, may cause the skirting to damage the trailer to which it is attached.

In order to avoid the difficulties aforesaid, the present invention contemplates a skirt made of skirt assemblies, the upper portion of which comprises a panel adapted to be secured to the trailer under frame or sill, the panel having slidable staves adapted to reach to the ground. Such staves may be relatively narrow and freely slidable vertically in regard to each other and in respect to the panel. Thus a skirt is provided that is capable of readily yielding to any variation in the trailer support or ground contour.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 1:
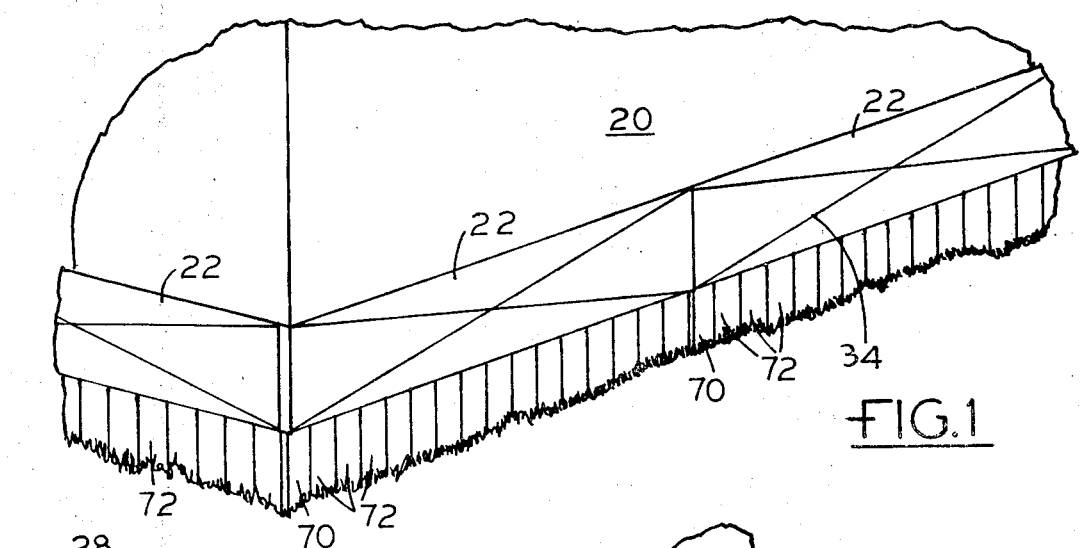
FIG. 1 is a side and end perspective view of a parked trailer showing the starting applied thereto.
Figure 2:
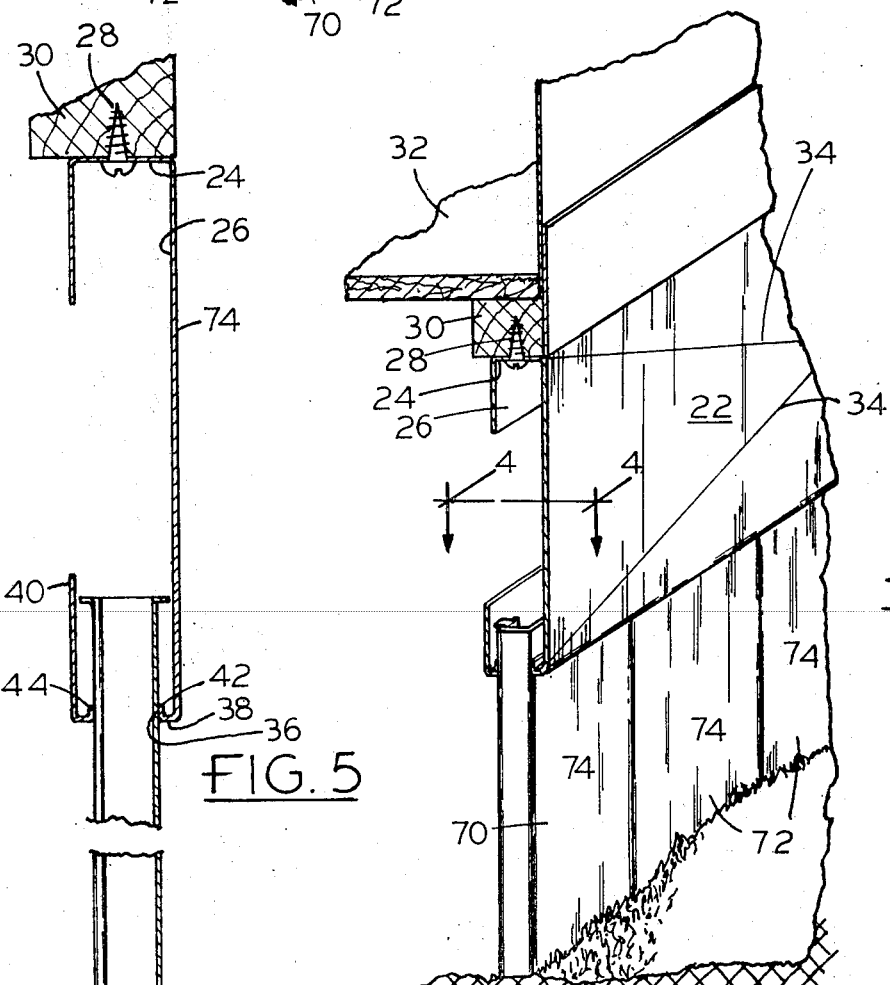
FIG. 2 is a fragmentary sectional view showing the skirt and ground engaging members.
Figure 5:
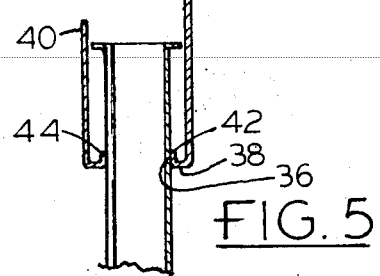
FIG. 5 is a sectional view taken on the line 5—5 of FIG. 4.

Referring to the drawings, there is shown in FIG. 1 a trailer 20 which has been parked, and set on blocks disposed at the corners to provide a solid support. A trailer, so mounted on blocks provides an unsightly appearance beneath the lower sill. In order to close off the space below the lower sill and provide a neat appearance, there is provided a plurality of panel sections 22 disposed end to end around the underside of the trailer such sections being formed of sheet metal. Each section comprises an upper integral channel formation comprising an upper end flange 24 and a depending rear skirt 26. The end flange 24 is provided with apertures 23 to receive screws 28 for fastening to the wood sill 30 usually provided beneath the flooring 32 of the trailer. The panel section may be stiffened by diagonal creases 34 to improve rigidity and prevent drumming.

Figure 6:
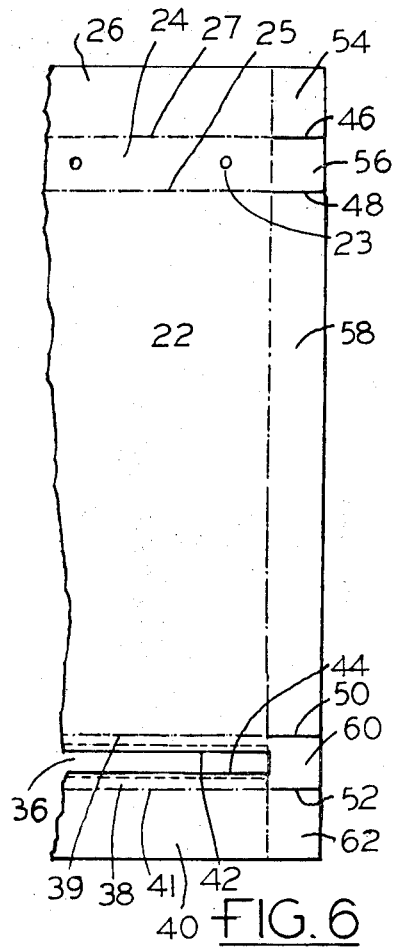
FIG. 6 is a fragmentary view of one end of the blank for forming the skirt.
Figure 7:
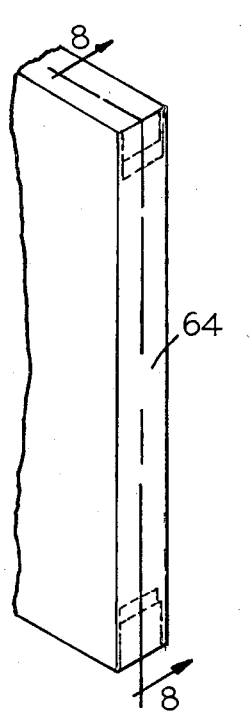
FIG. 7 is a perspective view of the skirt end.
Figure 8:
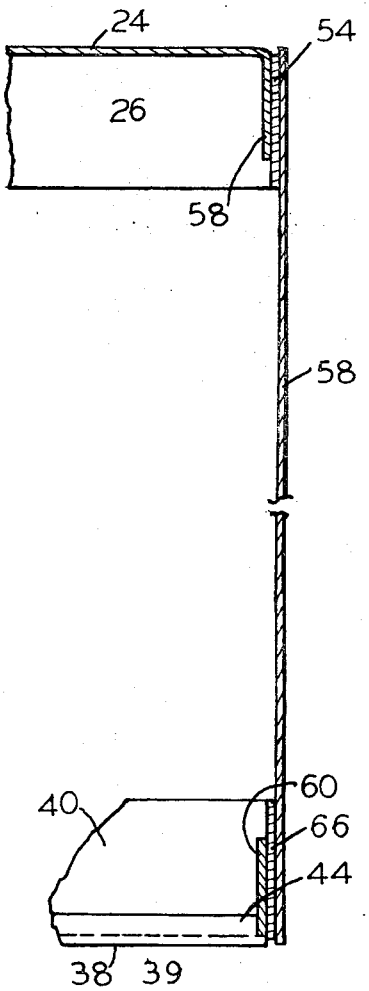
FIG. 8 is a sectional view taken on the plane 8—8 of FIG. 7.
Figure 9:
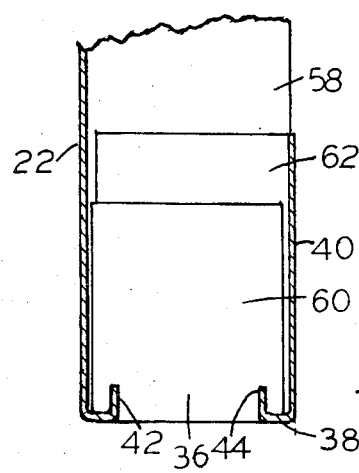
FIG. 9 is a fragmentary sectional view of the lower portion of the skirt taken on the line 9—9 of FIG. 4.

The lower edge of each panel is provided with a lengthwise extending slot 36 disposed in the bottom flange 38, such flange having a rear upwardly extending skirt 40. The slot 36 extends the length of the panel and the slot edges are stiffened by integral upwardly extending side flanges 42 and 44. Each panel section is formed from a blank of sheet metal, one end of which is shown in FIG. 6. As shown the panel portion 22 has an upper flange portion 24 and upper skirt portion 26 formed by folding on score lines 25 and 27, and a lower flange portion 38, with a slot 36 formed therein, and a lower skirt portion 40 to be formed by folding on score lines 39 and 41. The slot edges are flanged as at 42 and 44. The blank is cut at 46, 48, 50 and 52 to form tabs 54, 56 end closure section 58 and tabs 60 and 62. The blank is finished by bending the portions to provide a box like end 64 as seen in FIGS. 7, 8 and 9. The construction at either end is the same. The flange 24 has screw holes 23.

Slidably disposed in the slot 36 are a series of vertical staves, including an end stave 70 and adjacent staves 72. Assuming the panels to be 15 inches by 60 inches, and the staves about 4 inches wide, there will be assembled with each panel, 15 staves including one end stave 70 and 14 other like staves. Each of the staves 72 comprises a main section 74 about 15 inches high and four inches wide. The section 74 has side flanges 76 and 78 of an inch depth, or the width of the slot 36. The flange 76 has a lengthwise lip 80 which slides in a double bent lock 82 along the edges of the flange 78. The end stave 70 has a flange 79 at the slot end, and is provided with an inbent lip 84 instead of the double bend lock. The upper end of the lip 84, and double bend locks 82 are provided with lateral integral tabs 86 and 88 respectively and the main sections 74 are each provided with a wide tab 90. Such tabs engage the slot flanges 42 and 44 when the staves are fully extended downwardly and thereby confine the staves to their respective panel assembly and are prevented from dropping out.

Figure 3:
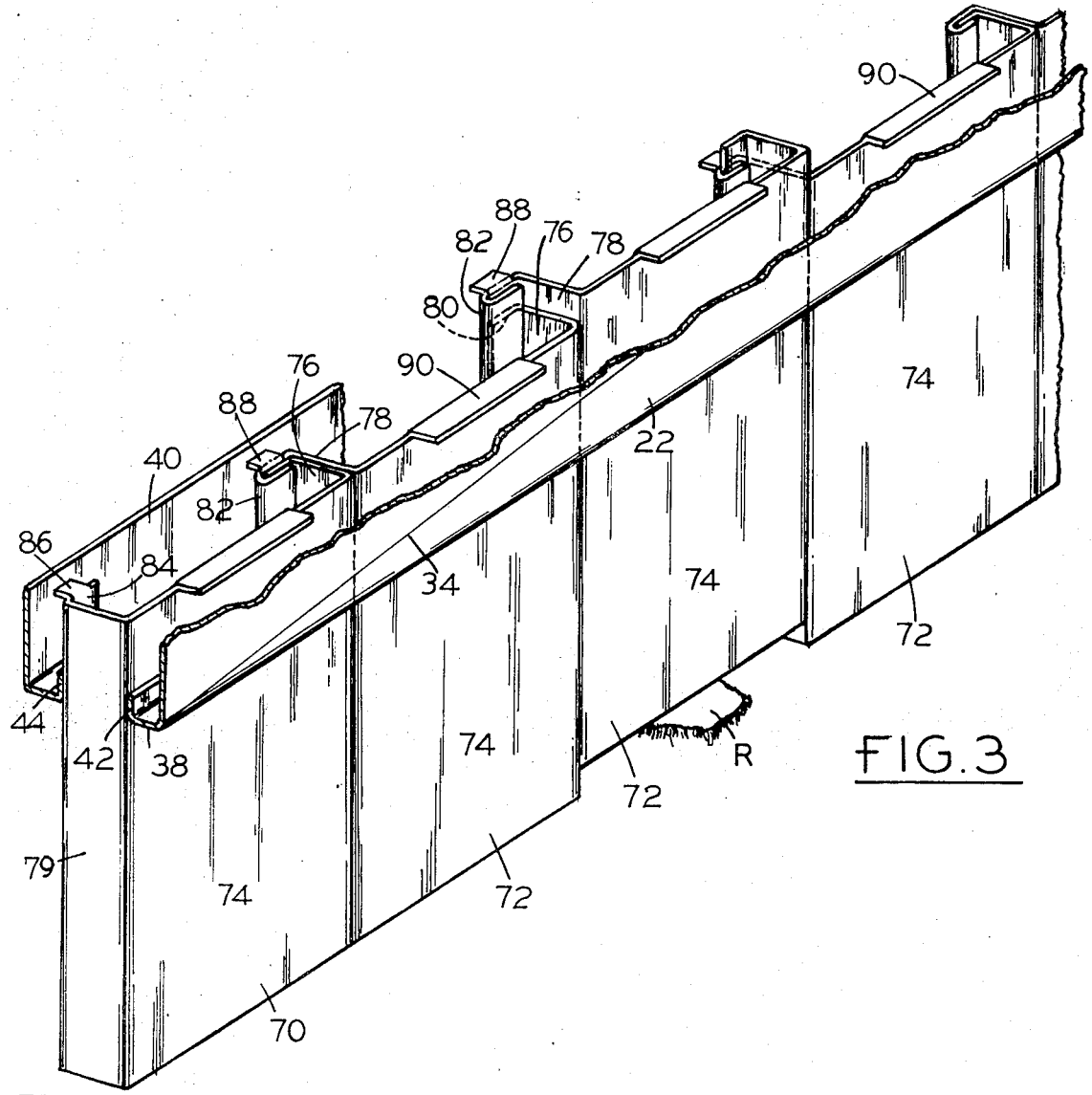
FIG. 3 is a perspective fragmentary view of the staves in the lower end of the side panel.
Figure 4:
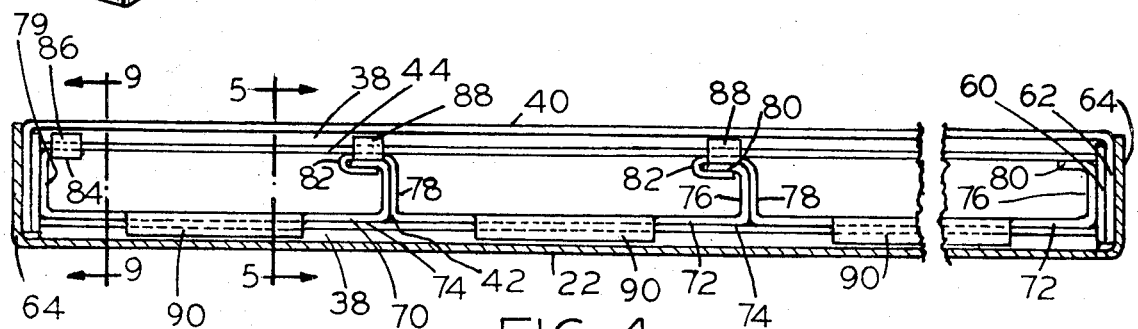
FIG. 4 is a sectional view taken on the plane 4—4 of FIG. 2.

Since the ground beneath the trailer may be uneven, and the distance between the trailer and ground may vary by settling or frost heaving, the skirt assemblies described will be seen to provide continual adjustment, by reason of each stave 70, or 72 being independently vertically slidable at the time of installation and at all times thereafter. As shown in FIG. 3, one of the staves is slid upward to accommodate a rock or ground irregularity R.

The skirt assemblies present a neat appearance and when installed will cut off drafts. Since the height is freely variable at all times, the skirt never assumes a trailer support function, which if rigid might otherwise distort, bend, or otherwise injure the trailer side walls.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

What is claimed is:

1. A skirt assembly for parked house trailers comprising an upper panel section adapted for attachment to the trailer near floor level in depending relation thereto and of a width less than the height of the trailer floor above ground level and a plurality of relatively narrow panels in telescoping relation to said upper panel section and in depending relation thereto; retaining means slidingly retaining said narrow panels in said telescoping relation to said upper panel section adjacent the lower edge thereof and behind the panel section and interengaging means connecting contiguous edges of adjacent narrow panels, said interengaging means permitting relative vertical movement between adjacent panels, whereby the vertical overall width of the assembly is variable along the length of said assembly.

2. A skirt assembly according to claim 1 wherein the upper panel section is provided with an upper flange adapted for attachment to the under side of a trailer sill, and a lower flange that is slotted lengthwise telescopingly receiving the narrow panels.

3. A skirt assembly according to claim 1 wherein the interengaging means between the narrow panels include a vertical extending lip on one panel, and a vertically extending U bend on the adjacent panel slidingly embracing said tongue.

4. A skirt assembly according to claim 3 wherein the narrow panels are flanged along their vertical side edges of a width approximating the width of the slot in the slotted flange, and wherein the tongue and U bend are disposed along the respective edges of said flanges.

5. A skirt assembly according to claim 4 wherein the narrow panels have a forward extending tab along the upper end of the narrow panel and a rearwardly extending tab at the upper end of the U bend, to engage the edges of the slot, and prevent disassembly of the upper panel and narrow panels.

References Cited
UNITED STATES PATENTS

| | | | |
|---|---|---|---|
| 2,830,334 | 4/1958 | Schroyer | 52—530 |
| 3,042,425 | 7/1962 | Cathey et al. | 280—150 |
| 3,106,411 | 10/1963 | Holmes | 280—150 |
| 3,417,519 | 12/1968 | Hitter | 52—530 |

HENRY C. SUTHERLAND, Primary Examiner

U.S. Cl. X.R.

52—530; 280—150